Figure 1:
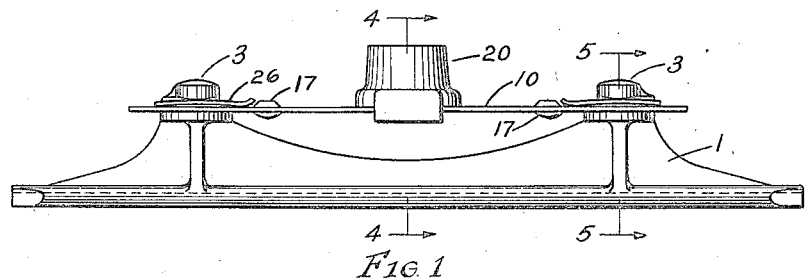

Oct. 8, 1935.  S. S. MATTHES  2,016,817

TROLLEY WIRE SUPPORT

Original Filed Aug. 1, 1933

Inventor
SAMUEL S. MATTHES

By

Attorney

Patented Oct. 8, 1935

2,016,817

UNITED STATES PATENT OFFICE 2,016,817

TROLLEY WIRE SUPPORT

Samuel S. Matthes, Mansfield, Ohio, assignor to The Ohio Brass Company, Mansfield, Ohio, a corporation of New Jersey Application August 1, 1933, Serial No. 683,166
Renewed April 12, 1935

7 Claims. (Cl. 191—40)

My invention relates to supports for conductors and particularly trolley wire conductors.

The object of my invention is to provide a support which will be flexibly hung from the overhead hanger thus tending to reduce so-called hard spots which tend to produce arcing between the current collector and trolley wire or trolley ear as the car passes under the support.

My invention resides in the new and novel construction, combination and relation of the various parts hereinafter described and shown in the drawing.

In the drawing—

Figure 2:
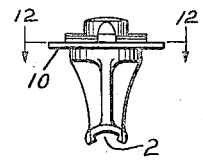
Figure 3:
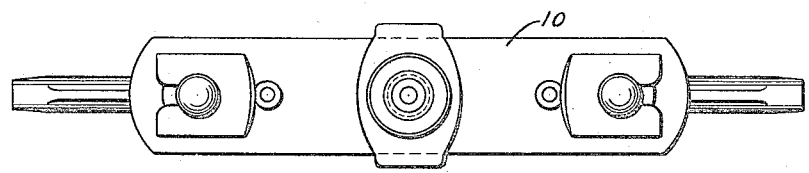
Figure 4:
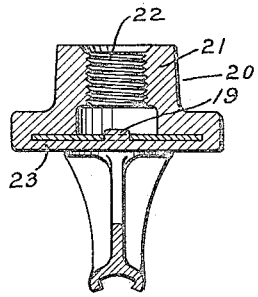
Figure 5:
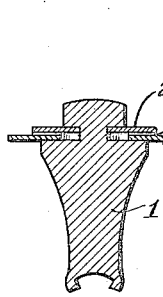
Figure 6:
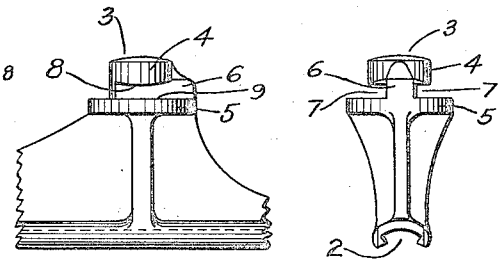
Figure 7:
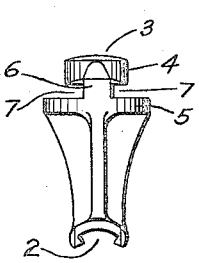
Figure 8:
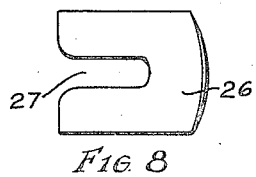
Figure 9:
Figure 10:
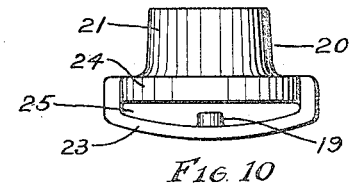
Figure 11:
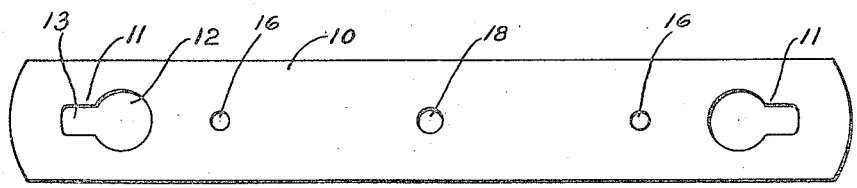
Figure 12:
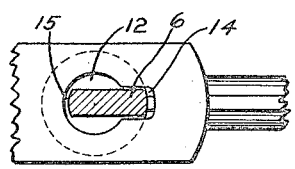

Fig. 1 is a side view of my invention.
Fig. 2 is an end view of Fig. 1.
Fig. 3 is a top view of Fig. 1.
Fig. 4 is a section taken on the line 4—4 of Fig. 1.
Fig. 5 is a section taken on the line 5—5 of Fig. 1.
Fig. 6 is a side view of a portion of the trolley ear to show the attaching boss thereon.
Fig. 7 is an end view of the trolley ear.
Fig. 8 shows a plan view of a locking clip.
Fig. 9 is an end view of Fig. 8.
Fig. 10 is an end view of the socket support before being assembled to the spring member.
Fig. 11 is a plan view of the supporting spring.
Fig. 12 is a section on the line 12—12 of Fig. 2.

In the preferred embodiment of my invention I employ a trolley ear 1 having a groove 2 arranged to receive and grip the trolley wire and provided with spaced supports 3 each having a head or flange 4 connected to the flange 5 by means of the connecting member 6 which forms with the head 4 and the flange 5 oppositely disposed grooves 7.

The lower face of the head 4 has its surface 8 convexed on each side of the member 6, while the opposite face 9 of the flange 5 is flat, although it also may be convexed if desired.

I also employ a spring member 10 preferably of steel and heat-treated. The spring is provided with spaced openings 11 adjacent the ends and each provided with an enlarged portion 12 through which the head 4 may pass and a reduced portion 13 through which the projecting portion of the connecting member 6 may pass. The supports 3 are so spaced with respect to the openings 11 that the spring and ear may be assembled and providing spaces 14 and 15 between the member 6 and the walls of the opening 11. The clearance 14 and 15 permits the spring 10 to take a curved position relative to the ear 1 under loaded conditions without end binding and without permitting displacement. The engagement of the member 6 with the sides of the slot portion 13 prevents lateral displacement of the members 1 and 10.

The member 10 is provided with the openings 16 in which are positioned rivets 17 provided with projecting heads for a purpose later explained.

The spring 10 is also provided with a central opening 18 to receive the stud 19 of the main supporting boss 20.

The boss 20 is provided with a socket portion 21 internally threaded at 22 for attachment to an overhead support, and is also provided with a yoke-shaped portion 23 which is shown in its original position in Fig. 10 and in its final position in Fig. 4. The socket 21 is provided with a flange 24 in which the yoke 23 is integrally connected and forms with the yoke 23 a space 25 in which the spring 10 is positioned.

The spring 10 is positioned in the slot 25 and the yoke 23 is then pressed into contact with the spring such that the projection 19 will pass through the opening 18 and thus locking the spring and support together and preventing relative movement.

The ear and spring are locked together by means of the spring key 26 which is made preferably of phosphor bronze of desired thickness and provided with an open slot 27 the width of which is sufficient to receive the connection 6. The key 26 is preferably curved with the end 27 bent upwardly slightly, although this is not necessary.

The key 26 tends to bind and lock the members 10 and 1 together and prevents relative movement therebetween other than such movement as may be permitted through the curved construction of the key, as there is preferably a space 28 between the key 26 and the spring 10 when the parts are assembled, as shown in Fig. 5. The key eliminates all rattles, however, between the ear 1 and the spring 10.

In assembling, the spring 10 is positioned on the ear 10 and then the key 26 is placed in position as shown in Fig. 1 and it will be evident that the projecting head on the rivet 17 will lock the key 26 against displacement.

The curved surface 8 assists in the application of the key 26 which is fairly stiff in that there are no sharp edges in contact with the key 26 when it is being applied.

The key 26 can be quite readily removed, thus permitting the renewal of the member 1 should it become necessary.

Having described my invention, I claim:—

1. A trolley wire hanger comprising an elongated spring member having spaced key-hole shaped openings adjacent the ends of the member, a suspension member secured to the spring member intermediate its ends and having means to receive a support member and means on the spring member to interlock with means on the suspension member to prevent relative longitudinal movement of the members, an elongated wire holding member having wire receiving and gripping means along one edge and a pair of spaced projections on the holding member registering with the openings in the spring member, each projection having a key-shaped part to pass through one of the key-hole shaped openings and having also a pair of grooves formed by parallel flanges of unequal diameter, a convexed yielding spring lock of sheet metal having an open end slot and positioned in the grooves and engaging the smaller of the said flanges and the spring to yieldingly hold the spring in engagement with the larger of the said flanges and the wire holding member in assembled relation to the spring without preventing relative longitudinal movement of the said members and fixed means on the spring to be engaged by the spring lock to prevent accidental displacement of the lock, the lock held under tension and preventing relative movement of the parts to prevent rattle.

2. A trolley wire hanger comprising an elongated spring member having spaced openings adjacent the ends of the member, a suspension member secured to the spring member intermediate its ends and means securing the spring and suspension members together against relative longitudinal movement, an elongated wire holding member having wire receiving and gripping means along one edge and a pair of spaced projections adjacent each end of the holding member registering with the openings in the spring member, each projection comprising a pair of spaced flanges connected by a contracted elongated neck portion, the upper of said flanges and said neck portion being capable of passing through the openings and forming a channel between the upper flanges and said spring member on each side of the neck portion, the length of the neck portion being less than the opening in the spring to permit the spring to yield under stress without binding on the spaced projections, a convexed spring lock of sheet metal for each projection and having an open end slot and positioned in the channels and engaging said upper flange and the spring member to yieldingly hold the spring member in engagement with the other flange and maintain the wire holding member in assembled relation to the spring without preventing the said relative longitudinal movement of the said members, and fixed means on the spring member to be engaged by the spring lock to prevent accidental displacement of the lock, the lock held under tension and preventing rattle between the parts.

3. A trolley wire hanger comprising an elongated spring member having spaced openings adjacent the ends of the member, a suspension member secured to the spring member intermediate its ends, an elongated wire holding member having wire receiving and gripping means along one edge and a pair of spaced projections one adjacent each end of the holding member registering with the openings in the spring member, each projection comprising a pair of spaced flanges connected by restricted means, the upper of said flanges of each pair and said restricted portion being capable of passing through the spring openings and, when assembled forming with the spring member a channel, means associated with at least one projection to cooperate with the spring to permit limited relative longitudinal movement of the wire holding means and the spring to prevent the spring binding under stress, a convexed spring lock of sheet metal for each projection and having an open end slot and positioned in the channels in engagement with the upper flange and the spring member to yieldingly hold the spring member in engagement with the other flange and maintain the wire holding member and spring assembled, and fixed means to engage the spring lock to prevent accidental displacement of the lock, the lock held under tension and preventing rattle between the parts.

4. A trolley wire hanger comprising an elongated spring member having spaced openings adjacent the ends of the member, a suspension member secured to the spring member intermediate its ends, an elongated wire holding member having wire receiving and gripping means along one edge and a pair of spaced projections one adjacent each end of the holding member registering with the openings in the spring member, each projection comprising a pair of spaced flanges connected by restricted means, one of said flanges of each pair being capable of passing through the spring openings and, when assembled forming with the spring member a channel, means associated with the restricted means to cooperate with the spring to permit limited relative longitudinal movement of the wire holding means and the spring to prevent the spring binding under stress, a convexed spring lock of sheet metal for each projection and having an open end slot and positioned in the channels in engagement with the said one flange and the spring member to yieldingly hold the spring member in engagement with the other flange and maintain the wire holding member and spring assembled and fixed means to engage the spring lock to prevent accidental displacement of the lock, the lock held under tension and preventing rattle between the parts.

5. A trolley wire hanger comprising an elongated spring member having spaced openings adjacent the ends of the member, a suspension member associated with the spring intermediate its ends, an elongated wire holding member having receiving and holding means along one edge and spaced means registering with the openings for supporting the holding member, each spaced means comprising a support for the ends of the spring member and a flange capable of passing through the openings and restricted means connecting the flange and the support, a groove formed on opposite sides of the restricted connecting means between each flange and spring member and adapted when assembled to receive an open-end convexed spring lock in engagement with the flange to maintain the spring and holding member assembled under tension, the restricted means arranged to cooperate with the spring to permit limited relative longitudinal movement of the spring and holding member to permit the spring bending under stress without binding.

6. A trolley wire hanger comprising a spring support and a wire holding member secured together at spaced points by yielding connections, the spring support provided with a suspension member to secure the hanger to an overhead support and with spaced openings adjacent its ends, the wire holding member provided with spaced attachments each comprising spaced parts connected by a third part and forming channels on opposite sides of the third part between the said spaced parts, one of the spaced parts and the third part arranged to pass through the openings in the spring member, at least one of the said third parts arranged to cooperate with the spring member to limit the relative longitudinal movement of the spring and wire holding member and yielding means positioned in the grooves of each attachment to hold the spring in engagement with the wire holding member without preventing the said limited longitudinal movement of the spring and wire holding member.

7. A conductor holder comprising an elongated body having a wire receiving and holding means along one edge and a support for a suspension member adjacent each end, each support having means to engage the suspension member and a flange spaced therefrom and connected by a restricted member, the flange arranged to pass through an opening in the suspension member, the flange and restricted member and suspension member arranged when assembled to form a pair of spaced channels to receive a slotted spring lock, means associated with the restricted member and projecting longitudinally beyond the flange to coact with the suspension member to limit the relative longitudinal movement between the suspension member and the holding member.

SAMUEL S. MATTHES.